United States Patent
Akiyama et al.

(10) Patent No.: US 11,326,561 B2
(45) Date of Patent: May 10, 2022

(54) CANISTER

(71) Applicant: AISAN KOGYO KABUSHIKI KAISHA, Obu (JP)

(72) Inventors: Takanori Akiyama, Nagoya (JP); Hiroyuki Takahashi, Nagoya (JP)

(73) Assignee: Aisan Kogyo Kabushiki kaisha

(*) Notice: Subject to any disclaimer, the term of this patent is extended or adjusted under 35 U.S.C. 154(b) by 0 days.

(21) Appl. No.: 17/061,838

(22) Filed: Oct. 2, 2020

(65) Prior Publication Data

US 2021/0102516 A1  Apr. 8, 2021

(30) Foreign Application Priority Data

Oct. 3, 2019  (JP) .............................. JP2019-182830

(51) Int. Cl.
  *F02M 33/02*  (2006.01)
  *F02M 25/08*  (2006.01)
  *B01D 53/04*  (2006.01)

(52) U.S. Cl.
  CPC ..... *F02M 25/0854* (2013.01); *B01D 53/0407* (2013.01); *B01D 2253/302* (2013.01); *B01D 2259/4516* (2013.01)

(58) Field of Classification Search
  CPC .............. F02D 41/003; F02D 41/0032; F02D 41/0037; F02D 41/004; F02D 41/0042; F02M 25/0818; F02M 25/0836; F02M 25/0854
  USPC ...................................................... 123/519
  See application file for complete search history.

(56) References Cited

U.S. PATENT DOCUMENTS

| | | | | |
|---|---|---|---|---|
| 7,008,470 B2* | 3/2006 | Makino | ................... | B01D 53/02 |
| | | | | 123/519 |
| 7,458,367 B2* | 12/2008 | Kasuya | .............. | B01D 53/0415 |
| | | | | 123/519 |
| 8,920,547 B2* | 12/2014 | Takamatsu | ......... | B01D 53/0407 |
| | | | | 96/131 |
| 8,992,673 B2 | 3/2015 | Mani | | |

(Continued)

FOREIGN PATENT DOCUMENTS

| | | |
|---|---|---|
| JP | 2002256989 A | 9/2002 |
| JP | 2012007501 A | 1/2012 |

(Continued)

*Primary Examiner* — John Kwon
(74) *Attorney, Agent, or Firm* — Conley Rose, P.C.

(57) ABSTRACT

A canister includes a casing defining an adsorbent chamber. The casing includes a tank port in fluid communication with a fuel tank and an atmospheric port in fluid communication with the atmosphere. The canister includes at least three adsorbent sections arranged in series in the adsorbent chamber. The at least three adsorbent sections include a first adsorbent section proximate to the atmospheric port, a second adsorbent section disposed on a tank port side of the first adsorbent section, and a third adsorbent section disposed on a tank port side of the second adsorbent section. The first adsorbent section contains a first adsorbent, the second adsorbent section contains a second adsorbent, and the third adsorbent section contains a third adsorbent. An adsorption capacity of the first adsorbent is equal to or greater than an adsorption capacity of the second adsorbent. The adsorption capacity of the second adsorbent is greater than an adsorption capacity of the third adsorbent.

5 Claims, 2 Drawing Sheets

(56) References Cited

U.S. PATENT DOCUMENTS

| | | | |
|---|---|---|---|
| 9,334,836 B2 | 5/2016 | Akiyama et al. | |
| 10,508,620 B2 | 12/2019 | Kuboyama et al. | |
| 2002/0078931 A1* | 6/2002 | Makino | F02M 25/0854 123/519 |
| 2011/0315126 A1 | 12/2011 | Yoshida et al. | |
| 2012/0186563 A1* | 7/2012 | Hasegawa | B01D 53/0415 123/519 |
| 2012/0234301 A1* | 9/2012 | Takamatsu | F02M 25/0854 123/519 |
| 2014/0060497 A1* | 3/2014 | Akiyama | F02M 25/0854 123/519 |
| 2014/0060499 A1* | 3/2014 | Akiyama | F02M 25/0854 123/520 |
| 2015/0007799 A1* | 1/2015 | Takeshita | B01D 53/0407 123/519 |
| 2015/0275727 A1* | 10/2015 | Hiltzik | F01N 3/0807 123/519 |

FOREIGN PATENT DOCUMENTS

| | | |
|---|---|---|
| JP | 2013133731 A | 7/2013 |
| JP | 5925085 B2 | 5/2016 |
| JP | 2017110585 A | 6/2017 |

\* cited by examiner

CANISTER

CROSS-REFERENCE TO RELATED APPLICATIONS

This application claims benefit of Japanese Patent Application serial number 2019-182830 filed Oct. 3, 2019, which is hereby incorporated herein by reference in its entirety for all purposes.

STATEMENT REGARDING FEDERALLY SPONSORED RESEARCH OR DEVELOPMENT

Not applicable.

BACKGROUND

The present disclosure relates to canisters for fuel vapor treatment systems.

The fuel vapor treatment system in a vehicle, such as an automobile, includes a canister containing adsorbent that adsorbs and desorbs fuel vapor. The fuel evaporated from the fuel tank is adsorbed by the adsorbent in the canister. When the vehicle is traveling, that is, when the internal combustion engine is operating, the fuel vapor adsorbed in the adsorbent is desorbed into the purge line and supplied through the intake line to the internal combustion engine.

SUMMARY

A canister may include a casing defining an adsorbent chamber. The casing includes a tank port in fluid communication with a fuel tank and an atmospheric port in fluid communication with the atmosphere. The canister may include at least three adsorbent sections arranged in series in the adsorbent chamber. The at least three adsorbent sections may include a first adsorbent section proximate to the atmospheric port, a second adsorbent section disposed on a tank port side of the first adsorbent section, and a third adsorbent section disposed on a tank port side of the second adsorbent section. The first adsorbent section contains a first adsorbent, the second adsorbent sections contains a second adsorbent, and the third adsorbent section contains a third adsorbent. An adsorption capacity of the first adsorbent may be equal to or greater than an adsorption capacity of the second adsorbent. The adsorption capacity of the second adsorbent may be greater than an adsorption capacity of the third adsorbent.

DETAILED DESCRIPTION OF EMBODIMENTS

As previously described, the fuel vapor treatment system in a vehicle includes a canister containing adsorbent that adsorbs and desorbs fuel vapor. Canisters are required to reduce breakthrough emission of fuel vapor from the adsorbent into the atmosphere while the vehicle is stopped. Without being limited by this or any particular theory, it is believed that the diffusion of fuel into the adsorbent section located closest to the atmospheric port of the canister from upstream adsorbent sections might be a cause of breakthrough emission.

Figure 1:
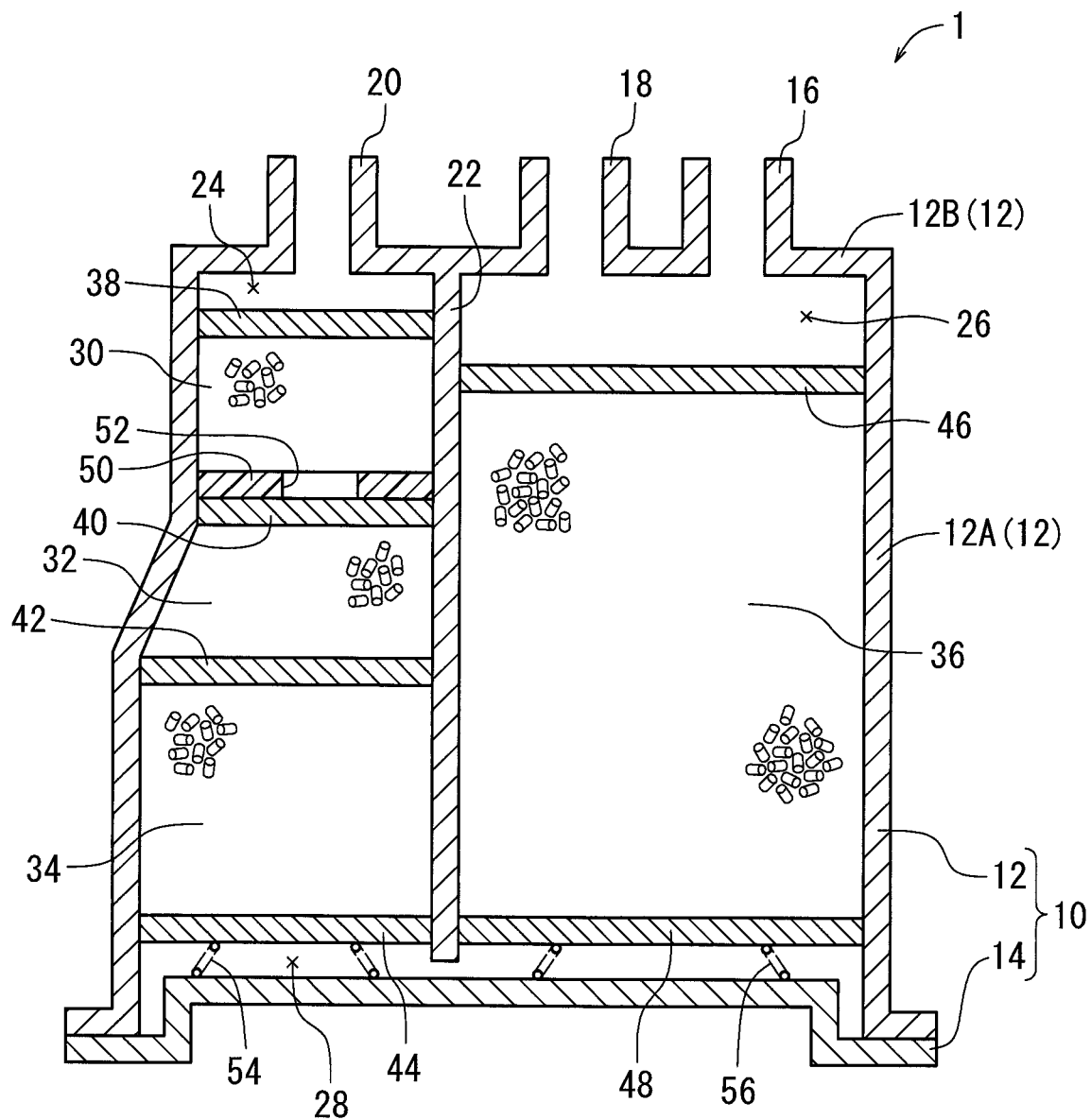
FIG. 1 is a cross-sectional view of a canister according to an embodiment.

Embodiments will be described with reference to the drawings. Referring now to FIG. 1, an automobile or other vehicle having an internal combustion engine (e.g. a gasoline engine) is provided with a canister 1. The position of the canister mounted in the vehicle is not limited to that shown in FIG. 1.

The canister 1 includes a casing 10 made of plastic, such as PA 66 (nylon 66). The casing 10 comprises a generally cylindrical casing body 12 with an open bottom and a lid 14 closing the open bottom of the casing body 12. The casing body 12 has lateral walls 12A and a top wall 12B that closes the top of the casing body 12. The top wall 12B of the casing body 12 includes a tank port 16 in fluid communication with a fuel tank that stores liquid fuel (e.g. gasoline), a purge port 18 in fluid communication with an intake line of the internal combustion engine, and an atmospheric port 20 in fluid communication with the atmosphere. A partition wall 22 extends downward from the lower side of the top wall 12B of the casing body 12 and divides the interior of the casing 10 into two adsorbent chambers 24, 26 disposed on opposite sides of the wall 22. A connecting passage 28 is provided between the lower end of the partition wall 22 and the casing lid 14 and extends between the adsorbent chambers 24, 26.

The adsorbent chamber 24 includes a first adsorbent section 30, a second adsorbent section 32, and a third adsorbent section 34. Each adsorbent section 30, 32, 34 is at least partially filled with adsorbent material, such as granular activated carbon. The first adsorbent section 30 and the third adsorbent section 34 are both arranged next to the second adsorbent section 32 such that the second adsorbent section 32 is positioned between the first adsorbent section 30 and the third adsorbent section 34. The other adsorbent chamber 26 includes a fourth adsorbent section 36 at least partially filled with adsorbent material, such as granular activated carbon. The adsorbent sections 30, 32, 34, 36 are bounded and sandwiched by corresponding partition elements from above and below. Each partition element is air permeable, such as a nonwoven fabric sheet, and comprises a porous plastic plate. Specifically, the first adsorbent section 30 is defined by the partition element 38 from above and the partition element 40 from below. The second adsorbent section 32 is defined by a partition element 40 from above and a partition element 42 from below. The third adsorbent section 34 is defined by a partition element 42 from above and a partition element 44 from below. The fourth adsorbent section 36 is held by a partition element 46 from above and a partition element 48 from below.

A portion of the lateral wall 12A at the second adsorbent section 32, that is, the middle portion of the left wall in FIG. 1 gradually inclines inwardly as it extends upward. As a result, the cross-sectional area of the adsorbent chamber 24 gradually decreases moving along the second adsorbent section 32 from the third adsorbent section 34 toward the first adsorbent section 30.

A narrowing element 50 is interposed between the first adsorbent section 30 and the partition element 40. The narrowing element 50 may be a plastic plate and includes a hole 52 extending therethrough at the center. In the connecting passage 28, a coil spring 54 is interposed between the partition element 44 and the casing lid 14, and another coil spring 56 is interposed between the partition element 48 and the casing lid 14. The coil springs 54, 56 are compressed between the partition element 44, 48, respectively, and the casing lid 14. The coil springs 54, 56 may be fixed by any means known in the art so as to be restricted from lateral movement. The coil spring 54 biases the partition element 44 upward, and the coil spring 56 biases the partition element 48 upward. A spacer (not shown) that does not prevent air flow may be interposed between the top wall 12B and the partition element 38 in the adsorbent chamber 24 to prevent upward movement of the first to third adsorbent sections 30, 32, 34. Similarly, another spacer (not shown) that does not prevent air flow may be also interposed between the top wall 12B and the partition element 46 to prevent the upward movement of the fourth adsorbent section 36.

The adsorption capacity (or working capacity) of the adsorbent of the first adsorbent section 30 is greater than or equal to the adsorption capacity of the adsorbent of the second adsorbent section 32. The adsorption capacity of the adsorbent of the second adsorbent section 32 is greater than the adsorption capacity of the adsorbent of the third adsorbent section 34. The adsorbent of the fourth adsorbent section 36 may have any adsorption capacity. In general, the adsorption capacity of an adsorbent material can be defined, for example, by BWC (Butane Working Capacity) determined by the test method of ASTM International D5228 (2016 edition). For example, the adsorbents of the first adsorbent section 30 and the second adsorbent section 32 each have a BWC of greater than 11 g/dL. Further, the BWC of the adsorbent of the first adsorbent section 30 is greater than or equal to the BWC of the adsorbent of the second adsorbent section 32. For example, an adsorbent with a BWC of 15 g/dL can be used for both the first adsorbent section 30 and the second adsorbent section 32. The second adsorbent section 32 has a greater BWC than the third adsorbent section 34. For example, the third adsorbent section 34 may contain an adsorbent with a BWC of 11 g/dL.

The volume ratio of the adsorbents of the first adsorbent section 30, the second adsorbent section 32, and the third adsorbent section 34 is in the range of 1.00:(0.70 to 1.00):(1.05 to 1.50). The fourth adsorbent section 36 may contain adsorbent of any volume.

In the embodiments described above, the adsorption capacity of the adsorbent of the first adsorbent section 30 is greater than or equal to that of the adsorbent of the second adsorbent section 32, and the adsorption capacity of the adsorbent of the second adsorbent section 32 is greater than the adsorption capacity of the adsorbent of the third adsorbent section 34. In general, as represented by Fick's equation below, the greater the difference in the concentration of the fuel vapor adsorbed in the adsorbent sections, the greater the diffusion from the adsorbent section of higher concentration to the adsorbent section of lower concentration.

$$J=Ddc/dx$$

J: Diffusion flux
D: Diffusion coefficient
c: Concentration
x: Position in the diffusion direction The fuel vapor generated in the fuel tank is introduced from the tank port 16 into the canister 1, and air with most fuel vapor removed flows out of the canister 1 from the atmospheric port 20. Therefore, when no adsorbent section is saturated, the concentration of the fuel adsorbed in the fourth adsorbent section 36, the third adsorbent section 34, the second adsorbent section 32, and the first adsorbent section 30 decreases in this order. Regarding the first adsorbent section 30 and second adsorbent section 32, the concentration of the fuel vapor in the second adsorbent section 32 is higher, so the fuel vapor diffuses from the second adsorbent section 32 to the first adsorbent section 30. If the adsorption capacity of the adsorbent of the first adsorbent section 30 is smaller than that of the adsorbent of the second adsorbent section 32, the fuel vapor diffused out of the second adsorbent section 32 into the first adsorbent section 30 might not be completely adsorbed by the first adsorbent section 30, and as a result, the excess fuel vapor may be emitted through the atmospheric port 20 into the atmosphere. That is, breakthrough emission might occur. In the present embodiment, however, since the adsorption capacity of the adsorbent of the first adsorbent section 30 is greater than or equal to that of the adsorbent of the second adsorbent section 32, such breakthrough emission is less likely to occur.

In a purge operation, purge air flows through the canister from the atmospheric port 20 toward the purge port 18. The fuel vapor desorbed from the adsorbent section adjacent to the atmospheric port 20 passes through the adsorbent sections situated more toward the purge port 18. Since the adsorbent of the first adsorbent section 30 has an equal or larger adsorption capacity than the adsorbent of the second adsorbent section 32, the concentration of the fuel vapor remaining in the second adsorbent section 32 after the purge operation will be relatively larger than the concentration of the fuel vapor remaining in the first adsorbent section 30. However, since the adsorbent of the second adsorbent section 32 has larger adsorption capacity than the adsorbent of the third adsorbent section 34, the concentration of the fuel vapor remaining in the adsorbent of the third adsorbent section 34 after the purge operation will be relatively smaller than the concentration of the fuel vapor remaining in the adsorbent of the second adsorbent section 32. Therefore, after the purging, fuel vapor diffusion from the second adsorbent section 32 occurs not only into the first adsorbent section 30 but also into the third adsorbent section 34. The reduced diffusion from the second adsorbent section 32 into the first adsorbent section 30 results in reduced breakthrough emission.

The volume ratio of the adsorbent of the first adsorbent section 30, the second adsorbent section 32, and the third adsorbent section 34 is preferably in the range of 1.00:(0.70 to 1.00):(1.05 to 1.50). In particular, the volume of the first adsorbent section 30 is preferably equal to or greater than the volume of the second adsorbent section 32. When the volume ratio of the first adsorbent section 30 and the second adsorbent section 32 falls within the above range, it is less likely that the amount of fuel vapor that cannot be adsorbed by the first adsorbent section 30 will diffuse out of the second adsorbent section 32. This may further reduce breakthrough emission. Furthermore, when the volume ratio falls within the above range, fuel diffusion from the second adsorbent section 32 into the third adsorbent section 34 occurs sufficiently to reduce the diffusion from the second adsorbent section 32 back into the first adsorbent section 30 after purging.

Figure 2:
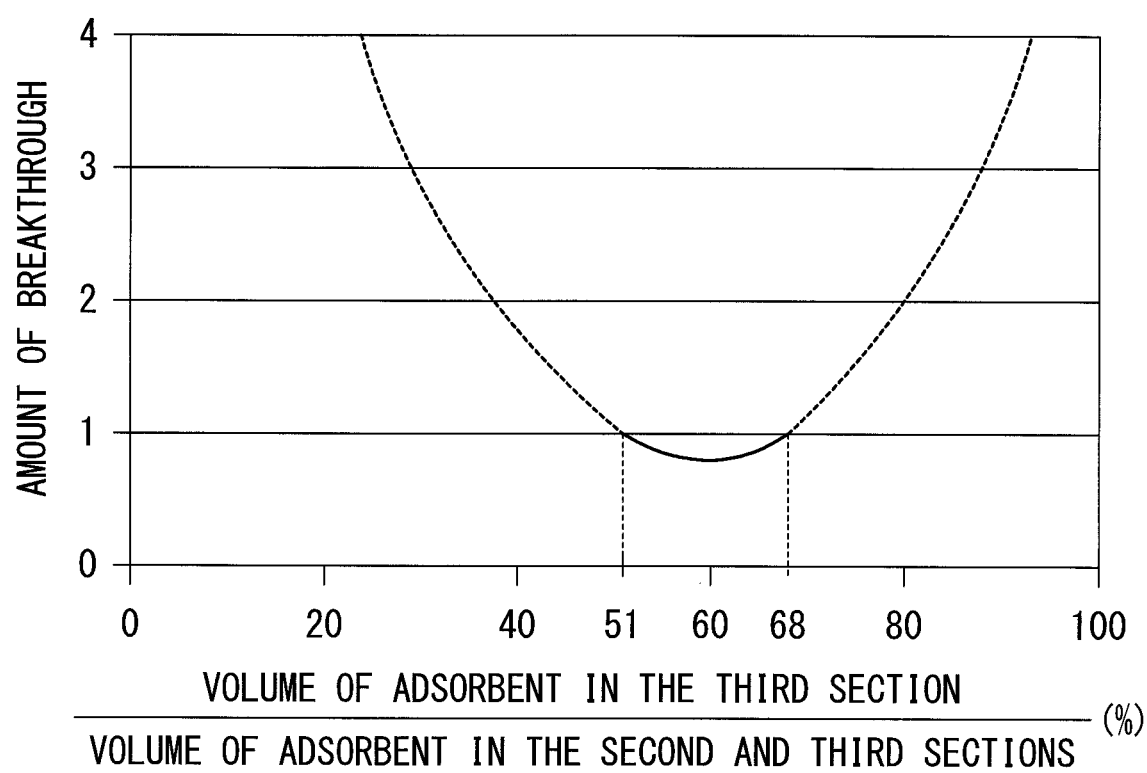
FIG. 2 is a graph of the fuel breakthrough from the canister of FIG. 1 plotted against the ratio of the volume of the adsorbent in the third adsorbent section to the sum of the volumes of the adsorbents in the second and third adsorbent sections of the canister of FIG. 1.

FIG. 2 shows a graph of the amount of fuel breakthrough from the canister 1 provided with the first 30, second 32 and third adsorbent section 34 (on the vertical axis) plotted against the percentage of the volume of adsorbent in the third adsorbent section 34 to the total volume of adsorbent in the second adsorbent section 32 and the adsorbent of the third adsorbent section 34 (on the horizontal axis). The adsorbents used in the first adsorbent section 30 and the second adsorbent section 32 have a BWC of 15 g/dL, and the adsorbent in the third adsorbent section 34 has a BWC of 11 g/dL. It can be seen from the graph of FIG. 2 that breakthrough emission is reduced when the volumes of the adsorbent in the second adsorbent section 32 and the third adsorbent section 34 fall within the range of ratio mentioned above. The breakthrough amount is minimized when the volume ratio of the adsorbent in the second adsorbent section 32 and the third adsorbent section 34 has the central value.

The narrowing element 50, disposed adjacent to the partition element 40 in the flow direction, increases the resistance to fluid (mixture of air and fuel vapor) from the second adsorbent section 32 toward the first adsorbent section 30. The fluid stays in each adsorbent section for a relatively long time, and therefore the amount of adsorption by these adsorbent sections increases. Further, the diffusion of the fuel vapor to the first adsorbent section 30, which is located closer to the atmospheric port 20 than the narrowing element 50, can be reduced.

The adsorbent chamber has cross-sectional area gradually decreasing along the second adsorbent section 32 moving upward from the third adsorbent section 34 toward the first adsorbent section 30. Therefore, in the portion of the casing 10 where the second adsorbent section 32 is disposed, the resistance to fluid flow increases when the flow from the tank port 16 to the atmospheric port 20 occurs. The fluid stays in each adsorbent section for a relatively long time, and therefore the amount of adsorption by these adsorbent sections increases. Further, diffusion of fuel vapor into the first adsorbent section 30 can be reduced.

The canister 1 has been described above as having four adsorbent sections 30, 32, 34, 36. However, the fourth adsorbent section 36 may be omitted. Alternatively, the canister may include five or more adsorbent sections. While the canister has been described above as of the U-flow type, the canister 1 may be of the I-flow type.

The cross-sectional area of the adsorbent chamber may gradually decrease at least partly from the third adsorbent section 34 toward the first adsorbent section 30. In an embodiment, the cross-sectional area of the adsorbent chamber may decrease at least at the second adsorbent section 32. In an embodiment, the cross-sectional area of the adsorbent chamber may decrease not only at the second adsorbent section 32 but entirely from the third adsorbent section 34 through the first adsorbent section 30.

While specific embodiments have been described above, it will be understood by those skilled in the art that various modifications may be made and equivalents may be substituted for elements thereof without departing from the scope of the disclosure.

What is claimed is:

1. A canister comprising:
a casing defining an adsorbent chamber, the casing including a tank port configured to be in fluid communication with a fuel tank and an atmospheric port in fluid communication with the atmosphere; and
at least three adsorbent sections arranged in series in the adsorbent chamber, wherein the at least three adsorbent sections comprise:
a first adsorbent section proximate to the atmospheric port, the first adsorbent section containing a first adsorbent,
a second adsorbent section containing a second adsorbent, and
a third adsorbent section containing a third adsorbent,
a flowpath extending through the casing between the tank port and the atmospheric port, wherein the flowpath extends through the first adsorbent section, the second adsorbent section, and the third adsorbent section, and wherein the second adsorbent section is located along the flowpath between the first adsorbent section and the third adsorbent section and the third adsorbent section is located along the flowpath between the second adsorbent section and the tank port,
wherein an adsorption capacity of the first adsorbent in the first adsorbent section is equal to or greater than an adsorption capacity of the second adsorbent in the second adsorbent section, and
the adsorption capacity of the second adsorbent in the second adsorbent section is greater than an adsorption capacity of the third adsorbent in the third adsorbent section.

2. The canister of claim 1, wherein the volume ratio of the first adsorbent, the second adsorbent, and the third adsorbent is in the range of 1.00:(0.70 to 1.00):(1.05 to 1.50).

3. The canister of claim 1, further comprising air-permeable partition elements separating the first adsorbent section, the second adsorbent section, and the third adsorbent section.

4. The canister of claim 3, further comprising a narrowing element disposed adjacent to at least one of the partition elements to narrow a cross section for fluid flow through the at least one of the partition elements.

5. The canister of claim 1, wherein a cross-sectional area of the adsorbent chamber decreases at least partly moving from the third adsorbent section toward the first adsorbent section.

* * * * *